United States Patent [19]

Koot

[11] Patent Number: 4,658,751
[45] Date of Patent: Apr. 21, 1987

[54] AMPHIBIAN VEHICLE FOR SHALLOW WATER

[75] Inventor: Bastiaan C. M. Koot, Puttershoek, Netherlands

[73] Assignee: Hydrowega Consulting BV, Netherlands

[21] Appl. No.: 762,799

[22] Filed: Aug. 2, 1985

Related U.S. Application Data

[63] Continuation of Ser. No. 547,840, Nov. 2, 1983, abandoned.

[51] Int. Cl.⁴ ............................................. B63B 35/28
[52] U.S. Cl. ...................................... 114/270; 37/54; 37/73
[58] Field of Search ................ 114/270, 344; 180/209, 180/308; 280/30, 415 R, 418; 37/73, 54, 71, 103; 56/8

[56] References Cited

U.S. PATENT DOCUMENTS

| | | | |
|---|---|---|---|
| 3,968,766 | 7/1976 | House | 114/270 |
| 3,987,563 | 10/1976 | Baur | 37/73 |
| 4,008,679 | 2/1977 | Bozzano | 114/270 |
| 4,070,978 | 1/1978 | Virgilio | 114/344 |
| 4,241,686 | 12/1980 | Westphalen | 114/270 |
| 4,470,209 | 9/1984 | Proehl | 37/73 |

Primary Examiner—Joseph F. Peters, Jr.
Assistant Examiner—C. T. Bartz
Attorney, Agent, or Firm—Andrus, Sceales, Starke & Sawall

[57] ABSTRACT

An amphibian vehicle for shallow water, adapted for executing ground operations, such as dredging, removal of growth in channels, ditches and water courses includes a hull (1) with floating capacity, comprising a pontoon onto which several mechanisms for adjusting the height of ground transport mechanisms can be mounted, such as vertically slidable posts (32) or pivotable two armed levers (8). The invention places the mechanisms (8;32) for adjusting the height and the bottom transport mechanisms outwardly from the hull (1) and therefore freely movable with respect to the hull. This gives an improved stability during the operations standing on the bottom (4) and also during sailing, whereby the possible applications are enlarged. As the vehicle is self propelled also the displacement speed can be substantially increased.

8 Claims, 6 Drawing Figures

AMPHIBIAN VEHICLE FOR SHALLOW WATER

This application is a continuation application of co-pending application Ser. No. 06/547,840, filed Nov. 2, 1983 and now abandoned.

The invention relates to an amphibian vehicle for shallow water, such as described in the preamble of claim 1.

As shown in the document FR-A-2.181.604 an amphibian vehicle is known which can ride on wheels over the bottom, which wheels can be retracted in wheel casings during the sailing. These wheel casings cause a substantial reduction of the strength of the hull and also occupy an important part of the useful cargo space. Furthermore the wheels always stand close together, causing both the transverse and the longitudinal stability against tilting moments to be small, when the vehicle stands on its wheels in the water. For this reason this vehicle is less suitable for executing ground operations, such as dredging, in which the ladder produces tilting moments on the vehicle.

The object of the invention is the removal of this objection, which is reached by the characterizing part of claim 1.

Through these measures is reached, that on the one hand the strength of the hull is substantially increased whereas on the other hand also the stability, primarily when resting on the bottom, but also when floating in the water, is essentially increased, for which reason the vehicle is exceptionally suitable for executing ground operations, such as dredging.

The document U.S. Pat. No. 3,740,075 shows a dredging pontoon which is displacable over the road, which pontoon can be suspended on the one end on a tractor and has a bogie at the other end. This vehicle is not self propelled and derives its stability during dredging from the usual anchor poles or spuds which are driven in the ground and when changing the location have to be withdrawn and later be driven back in.

The invention will now further be elucidated referring to the accompanying drawing of some embodiments.

Figure 1:
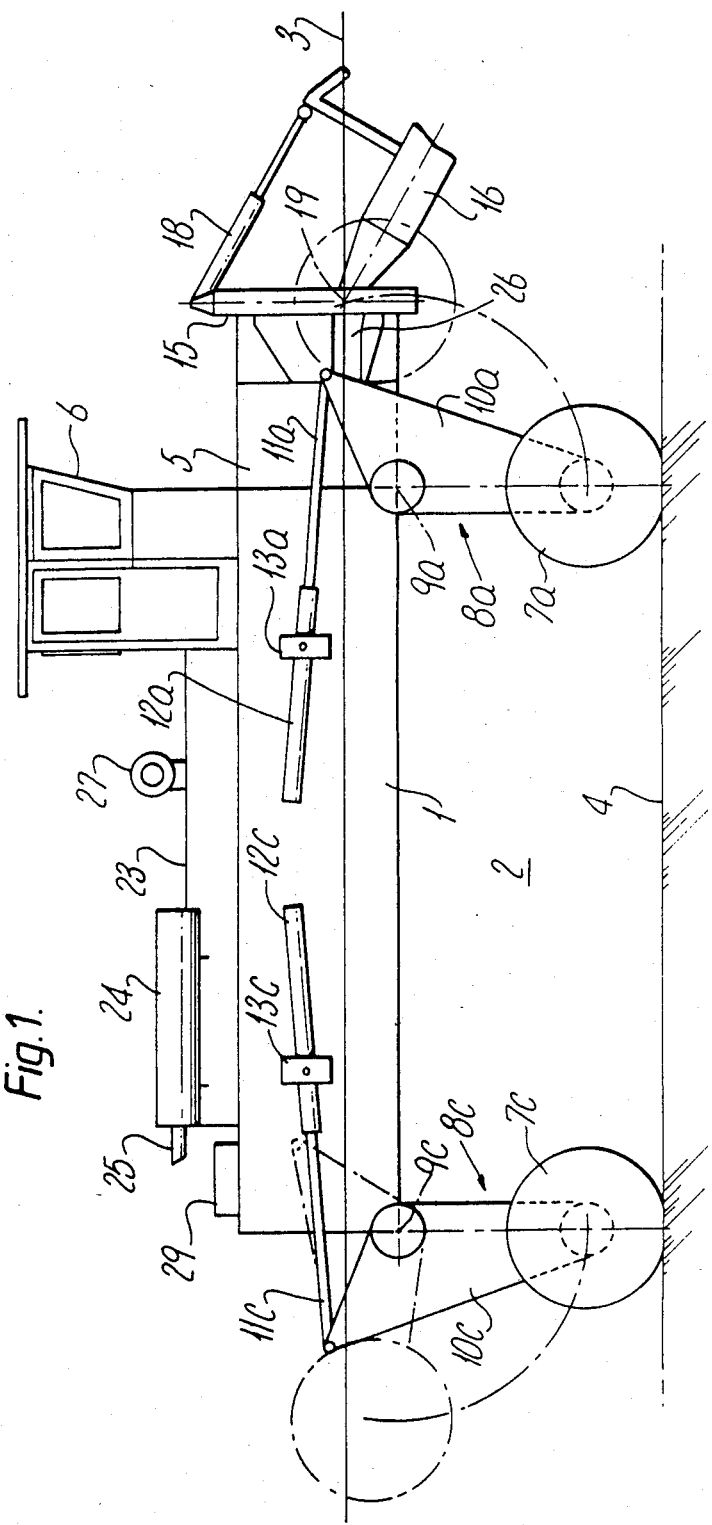
FIG. 1 is a side view of an amphibian vehicle according to a first embodiment, which is equipped for dredging work.
Figure 2:
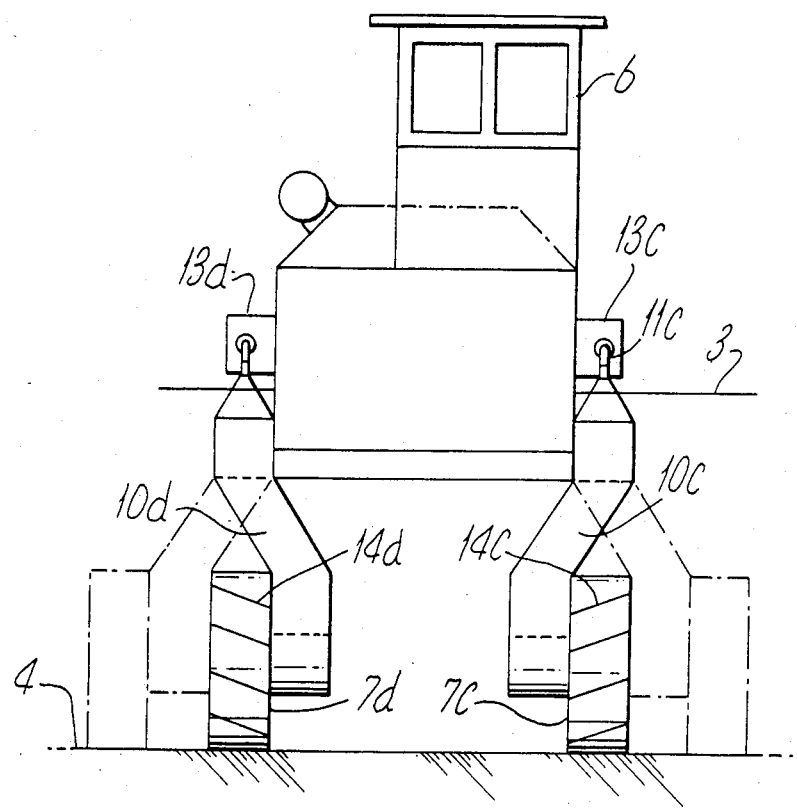
FIG. 2 is a rear view of the vehicle according to FIG. 1.
Figure 3:
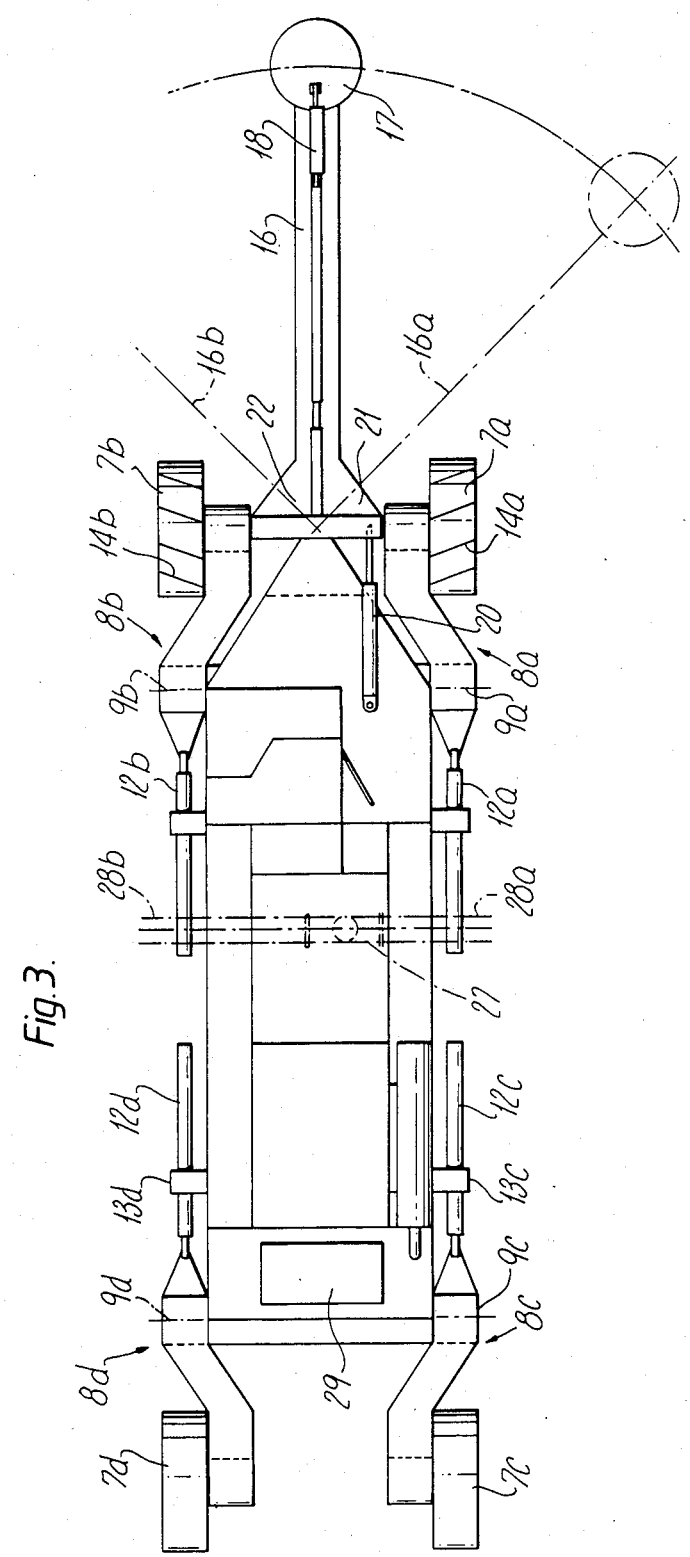
FIG. 3 is a plan view of the vehicle according to FIG. 1 and FIG. 2.

The first embodiment of an amphibian vehicle according to the invention shown in FIGS. 1-3 comprises a water tight hull 1 floating in the water 2 having a level 3 and a bottom 4. The hull 1 has been provided with a tapering bow 5. Furthermore the hull is provided with a operating house 6 for the operators of the amphibian vehicle. The hull is preferably a pontoon.

The amphibian vehicle has been provided with a ground transport mechanism which comprises in this first embodiment the four drum shaped wheels $7a$, $7b$, $7c$, $7d$, which can each be displaced by means of a separate height adjusting mechanism, generally indicated with $8a$, $8b$, $8c$ and $8d$, between a low and a high end position.

Each height adjusting mechanism $8a$ through $8d$ has a pivot shaft $9a$ through $9d$ which is fastened to the hull 1. The pivot shafts $9a$ and $9b$ near the front side of the hull 1 are coaxial, which is also valid for the pivot shafts $9c$ and $9d$ near the back side of the hull 1. About these pivot shafts $9a$ through $9d$ the two armed levers $10a$ through $10d$ are pivotable, which levers each have the form of an obtuse triangle in which the pivot shaft is mounted near the obtuse angle. On the bottom side of the long arm of the levers $10a$ through $10d$ a wheel $7a$ through $7d$ is arranged. The front wheels $7a$, $7b$ are driven by a (non shown) hydraulic motor, whereas the back wheels $7c$, $7d$ are each equipped with a (non shown) brake. At the end of the other arm of the levers $10a$ through $10d$ the outer end of the piston rod $11a$ through $11d$ is respectively pivotally fastened, which piston rods are each displacable in a hydraulic cilinder $12a$ through $12d$ which in their turn are each pivotally mounted around a pivot shaft $13a$ through $13d$ on the side walls of the hull 1.

With this structure of the ground transport mechanism 7 and the height adjusting mechanism 8 the amphibian vehicle can displace itself through the water within the limits of the high and the low end position, which have been indicated by means of the dash-dot and solid lines respectively in FIG. 1. In the low end position the amphibian vehicle rests on the bottom 4 and in the high end position the vehicle is freely floating. The displacement in the direction of movement is therein possible by means of the driven wheels 7.

Such as is shown with dash-dot lines in FIG. 2 the two armed levers 10 can also be outwardly bent, by means of which the gauge of the amphibian vehicle is increased, which again results in an increased transverse stability.

The drum shaped wheels $7a$ through $7d$ can be provided with means $14a$ through $14d$ which increase the grip on the bottom 4, which means can for example comprise ridges, pins and such.

The amphibian vehicle has been provided with a dredging installation with which the bottom 4 of the water 2 can be dredged out. This dredging installation comprises a ladder 16 which is pivotable around a vertical axis 15 near the bows 5 of the hull 1. In FIG. 3 the maximum pivot positions $16a$ and $16b$ have been indicated with dash-dot lines. On the outside of this ladder 16 a preferably horizontal cutter 17 is mounted, which can be controlled by means of a adjusting piston-cylinder unit 18. The ladder 16 can be moved upward or downwardly around the horizontal axis 19 by means of the piston-cylinder unit 18. The pivoting out of the ladder 16 between the end positions $16a$ and $16d$ takes place by means of the piston-cylinder unit 20, which is pivotally mounted to the one outer end of the ladder foot 21, whereby the ladder 16 is pivotable around the vertical axis 22.

Furthermore the dredging installation includes a pump room 23 for a (non shown) dredging pump which is driven by a (non shown) prime mover, such as for example a Diesel engine, comprising a muffler 24 and an exhaust 25.

The suction line 26, which is visible in FIG. 1 and is fastened to the ladder 16, extends through the hull 1 to the (non shown) dredging pump which is provided with an outlet pressure line 27, to which transport lines $28a$ and $28b$ respectively can be connected for the removal of the dredging matter. For the hydraulic operation of the several piston-cylinder units a tank 29 for hydraulic liquid is provided on top of the stern of the hull 1.

Figure 4:
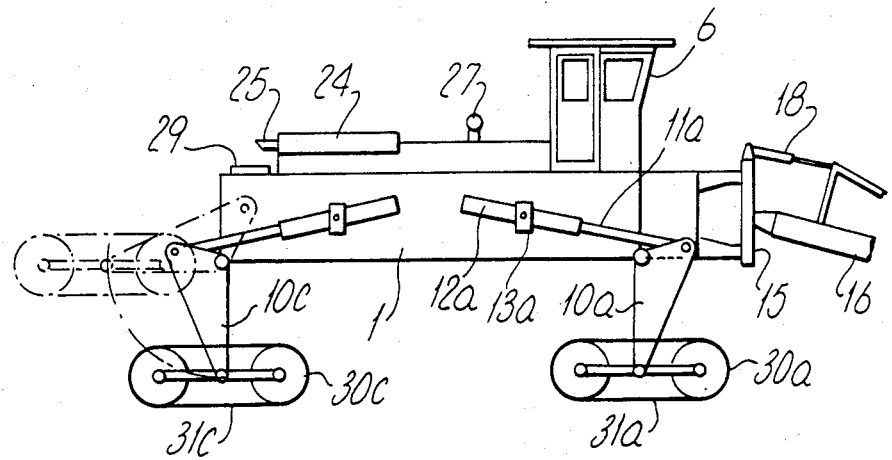
FIG. 4 is a side view on a smaller scale than FIG. 1-3 of a second embodiment of an amphibian vehicle.
Figure 5:
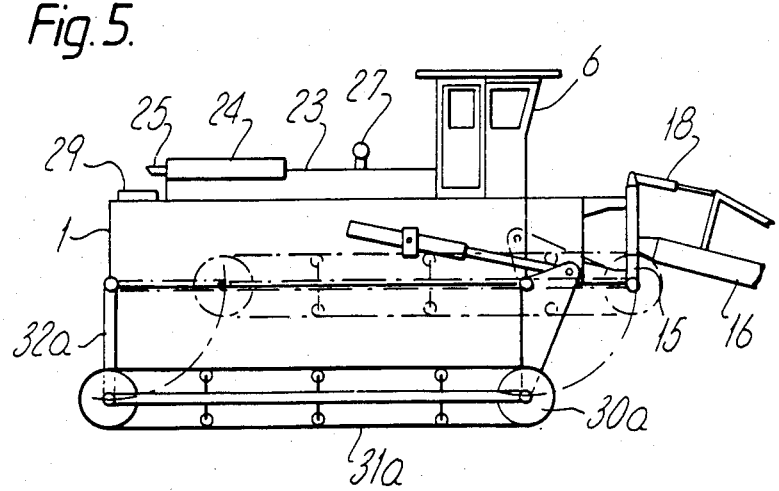
FIG. 5 is a side view on the same scale as FIG. 4 of a third embodiment of an amphibian vehicle.

FIGS. 4 and 5 show respectively a second and a third embodiment of the invention, in which the bottom transport mechanisms are provided with chain tracks.

FIG. 4 shows the mounting of four separate chain track-wheel bogies of which only the wheel bogies 30a and 30c are visible. These wheel bogies are, as in the embodiment according to FIGS. 1–3, pivotally mounted to the one end of the two armed levers 10, which in their turn are displaced between a high and a low end position by means of the pivoting piston-cylinder units 11 through 13. The wheel bogies 30a through 30d, which are provided with chain tracks 31, can each be separately driven by means of (non shown) hydraulic motors. The remaining parts of this amphibian vehicle equipped for dredging work according to FIG. 4 are the same as that of the embodiment according to FIGS. 1–3 and have therefore been provided with the same reference numerals. This is also valid for the third embodiment according to FIG. 5.

The embodiment according to FIG. 5 comprises a two chain track bogies with a length which is substantially the same as that of the hull 1, so that on both sides of this hull 1 only one bogie 30a and 30b respectively is mounted, of which only the bogie 30a is visible. The same is valid for the chain track 31a. For the height adjustment of these chain track wheel bogies at both sides only the front pivoting hydraulic piston-cylinder units 11 through 13a and b are present. Near the back side of the chain track bogies 31a respectively 31b only the pivoting arms 32 are present.

Figure 6:
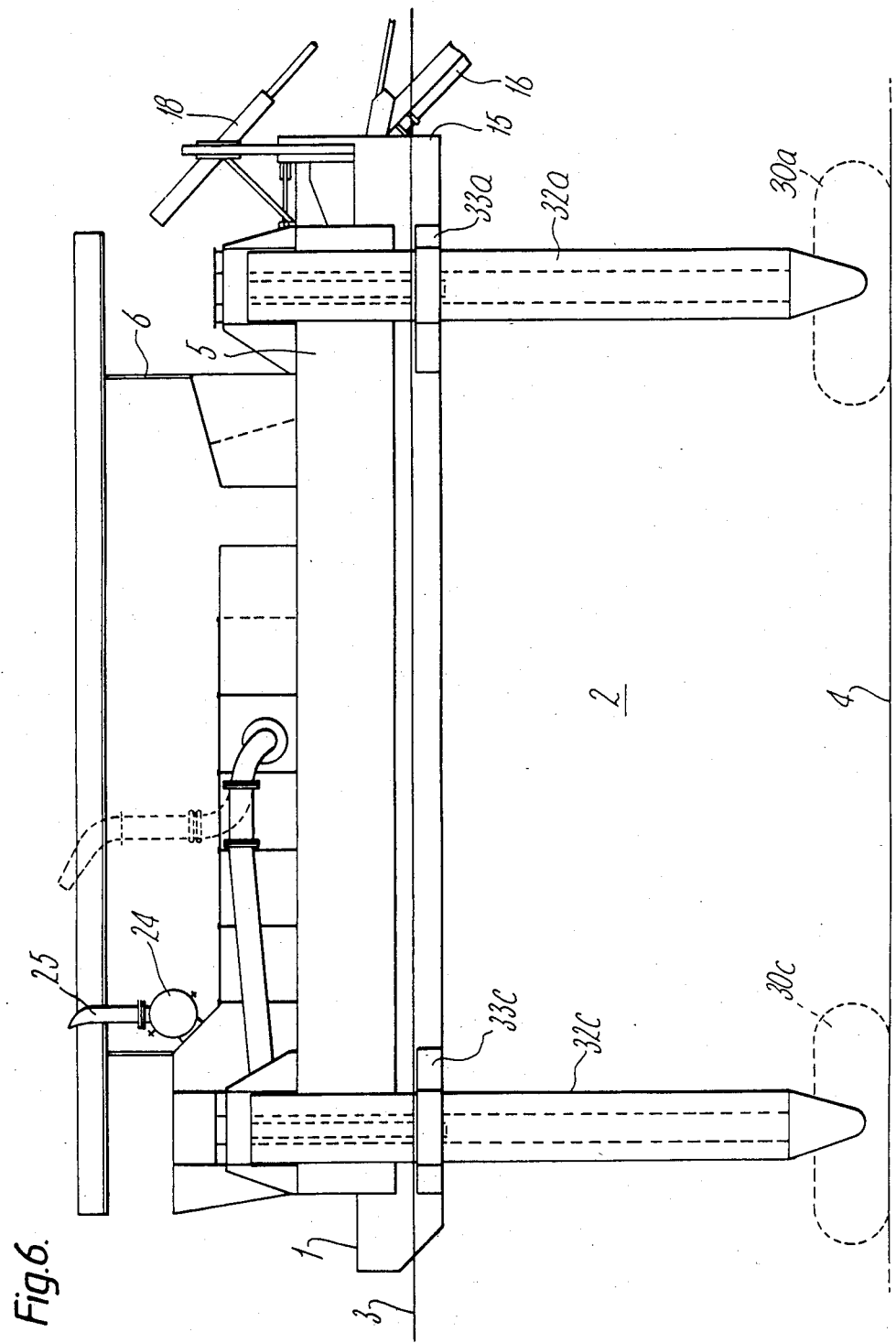
FIG. 6 shows a side view on another scale of a fourth embodiment of the invention with supporting posts.

FIG. 6 shows a fourth embodiment of the invention, in which the height adjusting mechanism is formed by posts 32 which are vertically slidable in guides 33 under influence of (non shown) hydraulic jacks. Below the post 32 chain track assemblies are fastened, which are pivotable around horizontal axes and can be tilted by means of (non shown) hydraulic means in order to roll easier over an uneven bottom. For the rest this fourth embodiment is in principle the same as the earlier one.

I claim:

1. An amphibian work vehicle for use in shallow water for performing operations such as dredging and removal of growths in channels, ditches, and water courses, said vehicle comprising:
    a single floatable hull (1) having a bow, a stern, and outer side walls having smooth, uninterrupted exterior surfaces, said side walls connecting said bow and said stern;
    a movable work implement (16, 17) pivotally mounted on a vertical axis (15) on the bow of said hull for movement from side to side with respect to said hull;
    a plurality of height adjusting mechanisms (8, 32) for transport mechanisms (7, 30, 31) mounted on said exterior surfaces of said hull side walls outwardly of said hull at opposite ends of lines extending completely through the hull and parallel to the beam of the hull, said height adjusting mechanisms being movable between a retracted position and a projected position, said height adjustment mechanisms and said transport mechanisms being disposed outwardly of said hull in both the retracted and projected positions of said height adjusting mechanisms; and
    said transport mechanisms being engageable with the ground and with the bottom of the shallow water, the adjustment in the height of said height adjustment mechanisms permitting the pressure of said transport mechanisms on the shallow water bottom to be controlled so that said transport mechanisms form a means for resisting the forces generated during the performance of work by the vehicle to maintain the vehicle at desired locations on the shallow water bottom and a means for driving the vehicle through the water in connection with the performance of such work.

2. The amphibian work vehicle defined in claim 1 wherein said height adjustment mechanisms are formed by a plurality of posts (32) having said transport mechanisms on the lower ends thereof, said posts being vertically slidable in guides (33) mounted on said exterior surfaces of said hull side walls.

3. The amphibian work vehicle defined in claim 2 wherein said posts (32) have hydraulic actuator means operatively associated therewith for sliding said posts in said guides.

4. The amphibian work vehicle defined in claim 1 wherein said height adjustment mechanisms (8) comprises at least a pair of two-armed levers (10) pivotally mounted on a horizontal axis on said hull and wherein the outer end of a first arm of each of said levers carries at least a part of a transport mechanism and the outer end of the second arm of each of said levers is pivotally connected to a linear movement mechanism (11, 12) for pivoting said levers.

5. The amphibian work vehicle defined in claim 4 wherein each of said linear movement mechanisms (11, 12) is a hydraulic piston-cylinder unit, of which the outer end of the cylinder rod (11) is pivotally connected to said second arm of each of said levers, and of which the cylinder (12) has a pivot connection with said hull (1).

6. The amphibian work vehicle defined in claim 1 wherein said transport mechanisms comprise a plurality of wheels (7).

7. The amphibian work vehicle defined in claim 6 wherein said wheels are drum shaped.

8. The amphibian work vehicle as defined in claim 1 wherein said transport mechanisms comprise one or more chain track assemblies (30, 31).

* * * * *